United States Patent
Narayanaswamy et al.

(10) Patent No.: US 6,759,070 B1
(45) Date of Patent: Jul. 6, 2004

(54) INERT-GAS BASED LEAVENED DOUGH SYSTEM

(75) Inventors: Venky Narayanaswamy, Maple Grove, MN (US); Linda R. Kreisman, St. Paul, MN (US); James E. Langler, White Bear Lake, MN (US); David W. Tobelmann, Plymouth, MN (US); Vijay Sood, Shorewood, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/707,184

(22) Filed: Nov. 6, 2000

(51) Int. Cl.⁷ ................................................ A21D 4/00
(52) U.S. Cl. .................... 426/128; 426/312; 426/316; 426/418; 426/496; 426/549
(58) Field of Search ........................................ 426/418

(56) References Cited

U.S. PATENT DOCUMENTS

| 3,767,422 A | | 10/1973 | Levitz | 426/152 |
|---|---|---|---|---|
| 4,511,585 A | * | 4/1985 | Durst | 426/128 |
| 4,904,493 A | | 2/1990 | Petrizzelli | 426/549 |
| 5,178,893 A | | 1/1993 | Seewi et al. | 426/549 |
| 5,366,744 A | * | 11/1994 | Drummond et al. | 426/128 |
| 5,384,139 A | | 1/1995 | Vasseneix | 426/128 |
| 5,624,697 A | | 4/1997 | Lin et al. | 426/241 |
| 6,039,994 A | | 3/2000 | Leflecher et al. | |

FOREIGN PATENT DOCUMENTS

| EP | 0443219 | 8/1991 | .......... A21D/10/04 |
|---|---|---|---|
| EP | 0868850 | 10/1998 | .......... A21D/10/00 |

OTHER PUBLICATIONS

The Wiley Encyclopedia of Packaging Technology, 1986, p. 218–221.*

* cited by examiner

*Primary Examiner*—Lien Tran
(74) *Attorney, Agent, or Firm*—Janal M. Kalis; John A. O'Toole; Douglas J. Taylor

(57) ABSTRACT

The present invention includes a ready-to-use dough article that provides an expanded baked product, such as a roll, pizza dough or scone. The dough article comprises a substantially gas-impermeable container. The dough article also comprises a dough having a cellular network that is substantially free of an active leavening agent. The dough is disposed within the container. The dough article also comprises an inert gas that is disposed within the container.

17 Claims, No Drawings

INERT-GAS BASED LEAVENED DOUGH SYSTEM

BACKGROUND OF THE INVENTION

The present invention relates to packaged food articles and to their methods of preparation. More particularly, the present invention relates to articles comprising a gas-impermeable container and a dough for baked goods that are storage stable at room temperature.

Preparation of baked goods such as sweet rolls, and biscuits from "scratch" has become a luxury that few households can routinely afford. Demands on homemakers' time and, increasingly, a very high expectation of quality, make it difficult for a homemaker to routinely prepare these types of goods. Furthermore, with other options available, such as purchasing pre-prepared biscuits and rolls, homemakers do not have to make these products from "scratch." One problem with pre-prepared biscuits and rolls, however, is that these products do not have the desired organoleptic properties of freshly baked home-made products.

Several products have been developed in an attempt to accommodate time restraints of homemakers and to provide a freshly baked product. These products include dry mixes and refrigerated doughs. For instance, EP Application No. 868,850, filed Apr. 4, 1997, describes a shelf stable cake dough that has a water activity below 0.85. The dough is packed in a gas-impermeable pouch in an atmosphere of an inert gas containing preferably less than 2% oxygen by volume. A high concentration of sugar is used to lower the water activity.

U.S. Pat. No. 5,178,893, which issued Jan. 12, 1993, describes a ready to bake dough, used to make bread, biscuits, and pastries. The dough includes water in a concentration of 8–20% by weight. The dough is prepared by making a premix comprising flour and fat and heating the premix. If water is added, the premix is heated under pressure.

Another shelf stable dough is described in U.S. Pat. No. 4,904,493, which issued Feb. 27, 1990. This patent describes a biscuit dough with a water activity within a range of 0.6 to 0.8. The dough is made with inactivated flour. EP Application 443 219 A1 describes extending shelf life of a dough by sterilizing each of an aqueous phase, and oil phase prior to mixing.

The Levitz Patent, U.S. Pat. No. 3,767,422, which issued Oct. 23, 1973, describes a shelf stable dough composition that has a moisture level between 18 and 24 percent. The dough contains pregelatinized starch and a cereal component comprising over-worked gluten. The dough is chemically leavened.

The Vasseneix Patent, U.S. Pat. No. 5,384,139, which issued Jan. 24, 1995, describes a method for rendering a food composition shelf stable. The method includes separating wet and dry components in compartmentalized packaging.

The Lin et al. Patent, U.S. Pat. No. 5,624,697, describes a dough that is proofed and then heated in order to form a skin. The skin imparts a structural integrity that inhibits moisture loss and that retains the shape of the proofed dough.

SUMMARY OF THE INVENTION

In its product aspect, the present invention resides in a ready-to-use dough article that provides an expanded baked product, such as a roll, pizza dough, biscuit, or scone. The dough article comprises a substantially gas-impermeable container. The dough article also comprises a dough having a cellular network that has expanded the dough. The expanded dough is disposed within the container. The dough comprises flour, a fat and water wherein the water activity is less than about 0.85. The dough article also comprises an inert gas that is disposed within the container. The dough contains less than about 4% residual oxygen. The dough is substantially free of an active leavening agent. For some embodiments, the dough includes an encapsulated leavening agent.

In one method aspect, the present invention resides in a method for making a ready-to-use dough article. The method comprises preparing a dry blend comprising flour and preparing a wet blend comprising water and fat. The wet blend and the dry blend are mixed to form a dough that has a water activity that is no greater than 0.85. For some embodiments, the method further comprises injecting an inert gas into the dough to form a dough that comprises an expanded cellular structure. For other embodiments, inert gas is not injected into the dough. For some embodiments, an encapsulated leavening agent is added to the dough.

In another method aspect of one and the same invention, the present invention resides in a method for expanding a dough. The method comprises preparing a high density dough. The high density dough is admixed with an inert gas to make a low density dough with an expanded, cellular structure.

DETAILED DESCRIPTION

The present invention relates to packaged, ready-to-bake doughs for leavened low sugar-high flour food products such as sweet rolls, pizza dough or biscuits characterized by shelf stability at room temperature and to their methods of preparation. Each of the food product components as well as product use and attributes and methods of preparation are described in detail herein.

Throughout the specification and claims, percentages are by weight and temperatures and degrees Fahrenheit unless otherwise indicated.

The food products comprise a gas impermeable container; a low water activity, low to medium sugar to flour ratio, expanded dough disposed within and partially filling the container; and an unpressurized, inert low oxygen gas atmosphere in the unfilled head space.

The container used in one embodiment of the present invention is either flexible or rigid or semi-rigid and of any suitable shape or configuration. For example, one type of container suitable for use includes a gas impermeable container such as a pouch fabricated from flexible laminate materials having low gas permeability. One suitable laminate is a gas impermeable polyester-aluminum-polyester laminate. Also useful are tubs fabricated from plastic, glass or metal.

In other variations, the container or portions thereof serve as a disposable baking container. For example, the container comprises an aluminum or an ovenable plastic baking tray or tub having an overlaying peelable gas impermeable foil membrane. Having the container function as a baking container adds further convenience by eliminating transfer of the dough from the container to the baking utensil.

The food product further comprises an expanded ready-to-bake dough disposed within the container. The dough comprises flour, fat and moisture. The dough optionally includes sugar and an encapsulated chemical leavening system or yeast.

"Dough" as used herein refers to an intermediate food product that has a gluten-based structure. In dough, the gluten forms a continuous dough elastic medium into which other ingredients are embedded. A dough is typically prepared by mixing, and kneading and is often stiff enough to cut into various shapes. Doughs are generally used to make low sugar- to- flour ratio products such as breads, quick breads, biscuits, scones and so on.

The present doughs essentially comprise a leavening ingredient such as a chemical leavening ingredient or a yeast leavening ingredient that upon baking expands the dough and forms a cellular network in the finished baked good. The leavening agent also includes an inert gas such as nitrogen, nitrous oxide, carbon dioxide or mixtures of these gases that are admixed with the dough. Leavening agents also include a combination of admixed inert gas and chemical leavening or yeast leavening agents.

By "cellular network" is meant a network of gas cells formed by an expansion of a gluten-based substrate. Ideally, the gas cells are of substantially uniform size.

In contrast, "batter" as used herein refers to an intermediate food product that comprises flour, water, eggs and salt and optionally fat and sugars that are a starch batter-based composition. In a batter, gluten development is purposefully minimized. Batters are inelastic. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of container.

"Active leavening agent" as used herein refers to a conventional leavening system based upon leavening acid (s)—bicarbonate and to yeast leavening. An encapsulated leavening system as used herein is not "active."

Flour

The present dough compositions comprise from about 15 to 70% of the dough as flour. Conventionally, flour is standardized to a moisture content of about 14%. Flours useful herein are of a conventional type and quality including cake flour, bread flour, and all-purpose flour. Wheat flours are preferred but other flours conventionally used in the preparation of baked goods are also employed in full or partial substitution for the wheat flour. Traditional cake flour used for layer cakes has about 8% or less protein by weight of the flour. Pastry flour ordinarily has a protein level of about 10%. Other flours such as bread flour generally have a higher protein level of about 11 to 13% by weight. One protein range for wheat flour used in the present invention is between about 9 to 10% by weight of the flour. A general all-purpose flour is also usable. This type of all-purpose flour generally comprises a mixture of both and hard and soft wheat flours, i.e., both high protein level and low protein level flours. Such flours are useful if the average protein content ranges from about 8 to 10% by weight.

While chlorinated flours are used herein, unchlorinated flours are also usable because chlorination is an expensive, though unnecessary flour processing step. Unmalted flours may be used provided the flours are derived from wheats with minimal sprout damage. Enzyme inactivated flours are also usable. In particular, flours that are free of alpha-amylase activity and have a very reduced lipasic and peroxidasic activity are usable.

Sugar

The dough compositions of the present invention also essentially comprise 0–5% of sugar by weight. A nutritive carbohydrate sweetener ingredient in a ratio of about 0.0 to 0.25 to 0.75 is also usable. Typically, sucrose is used in mixes for baked goods as the sugar ingredient, although up to about 30% of the sugar in the present invention food products is supplied by dextrose or other nutritive carbohydrate sweetening agents such as corn syrup solids. Commercially available milled sugar usually contains up to about 4% starch as an aid to maintaining its free-flowing properties.

Ordinary granulated sugars are satisfactory for use in the dry mix. These sugars include sucrose, dextrose, maltose, fructose, lactose, brown and invert sugars, alone or in combination. The preferred sugar is sucrose.

Sugar to Flour Ratio

The baker's ratio is the weight ratio of sugar to flour. The baker's ratio is used to provide desired baked good attributes. The baker's ratio of the food products of the present invention ranges from 0% sugar to a ratio of about 0.75. In preferred variations, the doughs include both low sugar and no sugar compositions characterized by a sugar to flour ratio ranging from 0% sugar to a sugar to flour or "baker's" ratio of about 0.25:1.

Fat

The dry mix compositions of the present invention, in some embodiments, comprise from about 0 to 25% of an edible fat or shortening ingredient. A shortening ingredient adds richness to the eating properties of the finished baked goods as well as aids in the leavening process.

These fat-bearing dough compositions of the present invention embodiments preferably additionally comprise from about 1% to about 15% of the shortening ingredient. A shortening component adds richness to the eating properties of the finished baked goods. The particular fat constituent level will depend particularly upon the desired type of finished baked good desired and its properties.

Maintenance of shortening concentrations within these limits is important for providing baked goods of acceptable textural quality. The fat constituent provides a solvent into which $N_2O$ gas dissolves as described in detail below.

Conventional shortening materials are suitable for use as the shortening ingredient of the present doughs. Such conventional shortening materials are well known in the dough art. The conventional shortenings useful herein include fatty glyceridic materials classified on the basis of their physical state at room temperature. Liquid shortenings or oils are usable and provide an advantage of ease or incorporation. Solid shortening is usable and provides an advantage of desirable mouthfeel upon consumption of the baked good. More commonly used are mixtures of liquid and solid shortenings. These mixtures are fluid or plastic depending, in part, on the level of solid fatty materials. Shortenings of this type comprise a liquid oil containing from about 2–26% normally solid fatty glycerides. This percentage corresponds to a solid content index, "SFI", at 70 and 4% to 6% at 100 F.

Solid fatty glycerides include fatty monoglycerides and diglycerides of saturated fatty acids having 16–22 carbon atoms. The liquid shortening is animal shortening, marine fats, vegetable or synthetic oil, such as sucrose polyesters, which are liquid at ordinary room temperature. Representative of such liquid shortenings include coconut oil, palm kernel oil, cottonseed oil, peanut oil, olive oil, sunflower seed oil, sesame seed oil, corn oil, safflower oil, poppyseed oil, soybean oil, canola (rapeseed) oil, babassue oil and the like. Other suitable shortening materials and methods of shortening preparation are described in detail in Bailey "Industrial Oil and Fat Products," (3rd ed. 1964) which is incorporated herein by reference.

Mixtures of the above oils are usable as are solid fatty materials, such as saturated triglyceride fats. In general, from about 1.5 to 25% triglycerides which are solid at 70 F are added to a liquid oil.

For certain embodiments, the preferred oils are soybean oil hydrogenated to an iodine value (IV) of from about 105 to 115, preferably about 107, corn oil, palm oil, hydrogenated palm oil, lard and tallow oils. Preferably, the oils used to prepare the shortening composition will contain only from about 1–7% hardstock. Hardstock is a hydrogenated triglyceride having an iodine value of 8 or less. Preferred hardstocks include hydrogenated soybean oil, hydrogenated cottonseed oil, hydrogenated palm oil and hydrogenated lard or tallow.

Some embodiments of the doughs of the present invention can further comprise about 1–5% of emulsifiers. The shortening provides a convenient carrier for addition of emulsifiers to the dough. The emulsifiers aid the realization of baked goods with improved grain structure and texture. The emulsifiers are also useful to maintain the emulsion integrity of the dough over extended room temperature storage.

The emulsifier typically comprises from about 1 to 20% of the shortening component, preferably about 5 to 15% and, in some embodiments, from about 10 to 15%. Emulsifiers may be prehydrated in an aqueous dispersion and added to the dough. The emulsifiers in other embodiments are part of an emulsion or dispersion with or without a fat component. Generally useful as emulsifier components of the shortening ingredient are partially esterified polyhydric compounds having surface active properties. This class of emulsifiers includes among others, mono and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulphuric acid esters, such as dodecylglyceryl ether sulfate and monostearin phosphate. Other examples include the partial esters of hydroxy carboxylic acid such as lactic, citric, and tartaric acids with polyhydric compounds, for example, glycerol lacto palmitate and the polyoxyethylene ethers of fatty esters of polyhydric alcohols, such as polyoxyethylene ether of sorbitan monostearate or distearate. Fatty acids alone or esterified with a hydroxy carboxylic acid, e.g., stearyl-2-lactylate are also useful.

In certain variations, all or a portion of the emulsifier component is preblended with the shortening or fat component. However, in other variations, a portion of the emulsifiers can be prehydrated and added along with the other wet ingredients. In still other variations, the emulsifiers can be plated onto various solid carriers such as flour, starch, sugars, milk powders, and the like, and admixed in with the various dry ingredients.

Moisture

The doughs of the present invention have a total moisture content of 10% to 20%. The total moisture includes water provided with or associated with the various essential and optional ingredients. For example, total moisture includes the moisture associated with flour, starch, flavorings such as cinnamon and especially liquid eggs. The total moisture is determined by a vacuum oven drying of the doughs herein. In certain preferred embodiments, no added water is employed to formulate the present doughs. Moisture is provided in pasteurized liquid eggs and the residual moisture associated with the dry ingredients.

The particular selection of ingredients and concentration are selected to provide doughs having a water activity that is less than 0.85. For some embodiments, the water activity is less than 0.50. Selection of such water activity value is important in achieving a balance between microbial shelf stability and dough handling characteristics. Water activity is reduced by using polyols such as glycerol and sorbitol; using little or no water to make the dough and by having salt, or sugar in the dough.

The present doughs are preferably not acidified and thus range in pH from about 6.5 to 8.0. In certain embodiments, the doughs herein can be essentially free of conventional activated leavening acids. The combination of a low oxygen gas in the head space and low water activity are sufficient to maintain shelf stability at room temperature.

If desired, the doughs further comprise about 1–8% of a humectant, preferably about 1–6%. Humectant addition is helpful in achieving the present essential water activity level and the microbial shelf stability at room temperature provided by the present food products. The humectant is any commonly employed humectant ingredient. Preferred humectants are selected from a group consisting of sorbitol, xylitol, mannitol, glycerin, glycerol, propylene glycol and mixtures thereof.

In other embodiments, the food articles of the present invention comprise an anti-mycotic ingredient such as sodium, potassium sorbate, calcium propionate, parabens, or propionic acid. While not needed to maintain shelf stability addition of such anti-mycotic ingredients so desired from a food safety standpoint anti-mycotic in case the physical integrity of the food product is comprised and compromised and oxygen leaks into the head space. Concentration ranges for calcium propionate from (0% to 0.2%) or while parabens concentration ranges from 0–0.1%. The food product of the present invention is specifically described in terms of sweet rolls, biscuits, scones and cinnamon rolls. Sweet rolls and cinnamon rolls are made from a dough having a pH of 6 to 8.

The leavened dough products of the present invention do not require a conventional activated acid/soda chemical leavening system. Some leavened dough embodiments include chemical leavening agents that are encapsulated and dispersed within the dough. However, these encapsulated leavening agents are not activated until heated at the time of baking. For instance, some dough embodiments include capsules that comprise sodium bicarbonate which has a coating of fat that melts during baking. The soda then reacts with leavening acids to leaven the product. The principle mechanism of leavening is incorporation of a gas such as $N_2O$, $CO_2$ or $N_2$ within the dough and a creation of air cells within the dough.

The dough of the present invention optionally includes a variety of ingredients suitable for rendering finished baked goods prepared therefrom more organoleptically desirable. These optional dry mix components include anti-oxidants, flavor/coloring agents, flavor chips, nuts and fruit pieces or other edible inclusions. The dough of the present invention also may include an ingredient such as inactivated yeast cells to impart a yeast flavor.

Another optional ingredient includes nonfat dry milk solids. Nonfat dry milk solids aid the structuring of the finished baked good. If present, such dry milk solids comprise from about 0.5 to 2.0% of the present doughs.

The product of the present invention also includes a container, dough stored within the container, the dough expanded with an inert gas, with a head space over the dough and inert gas within the head space. The inert gas comprises $N_2O$, $CO_2$ or $N_2$ or combinations of these gases. Residual oxygen content is less than 4% and for best results is less than 2%. For some embodiments, the food products of the present invention comprise $N_2O$ in the headspace. The $N_2O$ is partially dissolved in the dough and is in equilibrium with the inert gas in the headspace. An advantage is that the $N_2O$ functions as one of or even the sole leavening agent in the dough. Addition of $N_2O$ also to the headspace facilitates equilibrium between the headspace and the dough.

For some embodiments, the headspace comprises at least 10% (v/v) of $CO_2$, and may be at least 20%. At such levels, the $CO_2$ provides modest preservative properties against spoilage.

METHOD OF PREPARATION

The doughs of the present invention are prepared by blending the essential and optional components such as flour, salt, optionally sugar, shortening or oil, water and glycerol or other polyol together in such a conventional manner as to produce a well blended, low density $N_2O$ containing dough having densities ranging from about 0.7 to 1.1 g/cc. The dough is prepared from a wet emulsifier premix blend and a dry blend. The wet emulsifier premix blend includes oil or liquid shortening, eggs, glycerol, emulsifiers and so on. The dry blend includes flour, optionally sugar, salt and so on. The dry blend and wet blend are then combined under anaerobic conditions to form a dough. The dough can, for example, be prepared in a batch or a continuous mixing device adapted to add gas such as nitrous oxide to the dough.

The $N_2O$ is admixed with the dough to form a low-density dough in any convenient manner. For example, the admixture step, for some embodiments is practiced using a twin screw extruder equipped with a gas injection mechanism. The dry ingredients and wet ingredients are added to the twin screw extruder to form a dough. At a later stage of the extruder, $N_2O$ gas is injected and mixed in the extruder with the dough to incorporate sufficient amounts of $N_2O$ to form the low density $N_2O$ containing dough. An advantage of using a twin screw extruder is that a single piece of equipment is used to prepare the dough and to incorporate the $N_2O$ to form the low-density dough.

Another embodiment comprises preparing a high density dough, e.g. (i.e., about 1.1 g/cc to about 1.4 g/cc.) preferably 1.10 to 1.25 g/cc, using conventional dough preparation mixers and techniques. Thereafter, in a separate substep or piece of equipment, $N_2O$ is admixed with the high-density dough to form the present low-density dough (0.7 to 1.2 g/cc). For example, one well-known "Mondomix" mixer is used to emulsify and aerate gas, liquid and solid mixtures. The Mondomix mixer is manufactured by Mondomix B. V. of ZH Nederhorst den Berg in The Netherlands. The Mondomix mixer comprises a stainless steel mixing head which operates from 200 to 2,000 rpm. The mixer comprises 150 square stainless steel pins distributed in an intermeshing array between a rotor and an stator. These elements are positioned within a mixing chamber with an effective volume of 300 ml. The mixing chamber is double jacketed to control product temperature when mechanical energy is introduced to emulsify and aerate product streams.

One other mixer, a well-known "Goodway" mixer is often used in the aerated confection industry to aerate confection slurry to form aerated foam. The CM-6 continuous mixer/foamer manufactured by Goodway Sales, Inc., 175 Orville Drive, Bohemia, N.Y. comprises a mixing chamber fed by a positive displacement pump and air flow system. Product flow is controlled by flowmeter adjustment. Variable speed motors with ten turn controls power the mixer and pump drives. Stainless steel concentric rows of intermeshing teeth on two stators and one rotor produce a uniformity and consistency in the mix.

The high density dough is fed to the Mondomix mixer or the Goodway mixer. An $N_2O$ supply feeds the mixer. After incorporation, a low density $N_2O$ containing dough is formed. Other well-known apparatus and techniques, whippers or aerators are usable to practice the $N_2O$ incorporation into the dough step, e.g. an "Oakes" whipper.

The incorporation of $N_2O$ herein is distinguishable from merely flushing of $O_2$ with $N_2O$ as known in the art, even when several flushing cycles are practiced. Such mere flushing of $O_2$ with $N_2O$ does not result in a low-density dough as in the present invention.

Desired quantities of the $N_2O$ containing doughs are then charged or are otherwise disposed within the container to partially fill the container. For other dough embodiments that are not charged, the dough is also disposed within the container. The container is then flushed with an inert gas to remove residual air and to insure low oxygen in the headspace. Oxygen is equal to or less than 4% by volume. The containers are then sealed to form the finished ready-to-bake container articles. The articles have an extended shelf stability at room temperature and do not require refrigerated storage.

The temperature of dough during filling step can be at room temperature to warm temperature, e.g., 60 to 100 F (21.1 to 37.7 C). The packaged ready-to-bake baked goods dough articles herein do not require heat treatment such as pasteurization or refrigeration in order to obtain shelf stability notwithstanding having a relatively high pH. The products enjoy microbial stability and retain their good baking properties for as long as four to nine months at room temperature storage. The articles are packaged to be substantially unpressurized, i.e. can be packaged at atmospheric pressure.

The present doughs are conveniently prepared into finished baked goods by simple addition to a suitable baking container or pan and baking to form a finished baked good is charged into a baking container and baked for sufficient times, for example, at 160 to 218.3 C (325 to 425 F) for about 10 to 40 minutes to form a finished baked good.

Baking time depends on the thickness of the dough in the pan, with a longer bake time required for a thicker (higher) dough. Bake times range between about 10 to 45 minutes. The resultant finished baked goods are characterized by a springy texture. The finished baked goods are further characterized by being expanded or leavened and typically have densities ranging from about 0.3 to 0.6 g/cc. The finished baked goods are ready for immediate consumption or can be prepared on a commercial scale for distribution.

While the present invention finds particular suitability for use in connection with baked items such as biscuits, scones, quick breads, cinnamon rolls, sweet rolls, and so forth.

Also, while the present articles do not require refrigeration, the articles can be cooled and stored at refrigeration temperatures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A ready-to-use dough article, comprising:
   a substantially gas-impermeable container;
   a dough disposed within the container;
   an inert gas containing less than 4% residual oxygen disposed within the container and within the dough;
   flour said dough comprising and fat that are untreated by heat when mixed together and sugar wherein the ratio of sugar to flour is in a range of about 0.0 to 0.75 to 1, wherein the dough is storable without refrigeration.

2. The dough article of claim 1 wherein the dough comprises an encapsulated leavening ingredient.

3. The dough article of claim 1 wherein the dough further comprises a polyol.

4. The dough article of claim 1 wherein the inert gas is nitrous oxide or nitrogen or carbon dioxide or mixtures of these gases.

5. The dough article of claim 1 wherein the inert gas is a mixture of carbon dioxide and nitrous oxide.

6. The dough article of claim 1 wherein the dough is substantially free of sugar.

7. The dough article of claim 1 wherein the gas-impermeable container comprises a pouch.

8. The dough articles of claim 1 wherein the gas-impermeable container comprises a baking pan.

9. The dough article of claim 1 wherein the dough is a biscuit dough.

10. The dough article of claim 1 wherein the dough is a roll dough.

11. The dough article of claim 1 wherein the dough is a scone dough.

12. The dough article of claim 1, further comprising fat wherein the fat does not exceed about 25% of the dough by weight.

13. The dough article of claim 1 wherein the density of the dough ranges from 0.7 to 1.1 g/cc.

14. The dough article of claim 1 wherein the dough is pizza dough; or English muffins.

15. A ready-to-use expanded dough article, comprising an elastic gluten based dough having a cellular network structure and a substantially gas-impermeable container within which the dough is sealed, made by a method comprising:
   preparing a dry blend comprising flour and sugar wherein the ratio of sugar to flour is in a range of about 0.0 to 0.75 to 1,
   preparing a wet blend;
   mixing the wet blend and dry blend without an addition of heat;
   expanding the dough by injecting, mixing or blending an inert gas into the dough to form an expanded dough comprising a cellular structure;
   transferring the expanded dough to the container; and sealing the container, and storing the dough sealed in the container without refrigeration.

16. The expanded dough article of claim 15 in which the inert gas is selected from the group consisting of $N_2O$, $N_2$, $CO_2$ and mixtures thereof.

17. The expanded dough article of claim 15 in which the dough formed by mixing the dry blend and the wet blend further comprises an encapsulated leavening agent.

* * * * *